United States Patent
An (10) Patent No.: US 9,651,296 B2
(45) Date of Patent: May 16, 2017

(54) REFRIGERATOR

(71) Applicant: SAMSUNG ELECTRONICS CO., LTD., Suwon-si, Gyeonggi-do (KR)

(72) Inventor: Jae-koog An, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 14/539,511

(22) Filed: Nov. 12, 2014

(65) Prior Publication Data

US 2016/0025406 A1 Jan. 28, 2016

(30) Foreign Application Priority Data

Jul. 25, 2014 (KR) .................. 10-2014-0094629

(51) Int. Cl.
*B65D 88/54* (2006.01)
*F25D 23/12* (2006.01)
(Continued)

(52) U.S. Cl.
CPC ............ *F25D 23/126* (2013.01); *C02F 1/003* (2013.01); *C02F 1/4674* (2013.01); *F25C 5/005* (2013.01);
(Continued)

(58) Field of Classification Search
CPC .............. F25D 23/126; F25D 23/028; F25D 2323/121–2323/122; F25D 11/00; F25D 23/02; F25D 23/12; F25C 5/005; F25C 2400/10; C02F 1/46104; C02F 2201/4611; C02F 1/001; C02F 1/441; C02F 1/461; C02F 9/00; C02F 9/005; C02F 2307/12; C02F 1/4674; B67D 7/76; B67D 7/78; A47J 31/446; A47J 31/4464; B01D 2267/60; B01D 27/00; B01D 27/103; B01D 27/10; B01D 27/146; B01D 35/027; B01D 35/30; B01D 35/306; B01D 35/34; B01D 35/147
(Continued)

(56) References Cited

U.S. PATENT DOCUMENTS

| 5,083,442 A * | 1/1992 | Vlock .................... B01D 61/08 210/206 |
| 5,112,477 A * | 5/1992 | Hamlin ................. B01D 61/08 210/102 |

(Continued)

FOREIGN PATENT DOCUMENTS

| KR | 10-2011-0136909 | 12/2011 |
| KR | 10-2011-0138777 | 12/2011 |

*Primary Examiner* — Andrew P Bainbridge
(74) *Attorney, Agent, or Firm* — Staas & Halsey LLP (57) ABSTRACT

A refrigerator includes a body configured to be equipped with a storage, a door configured to be hinge-engaged with the body to open or close the storage, a water supply line configured to respectively supply water provided from a water source to an ice maker placed in the storage and a dispenser placed outside the door. One or more filters are configured to be engaged with the water supply line, and one or more bypass valves for respective water tanks are configured to be engaged with the water supply line at a part which is lower than an engagement point of the one or more filters. The one or more water tanks are configured to be placed inside the door and to be detachably engaged with the bypass valve for water tank.

20 Claims, 9 Drawing Sheets

(51) Int. Cl.
| | |
|---|---|
| *F25D 23/02* | (2006.01) |
| *F25C 5/00* | (2006.01) |
| *C02F 1/00* | (2006.01) |
| *C02F 1/467* | (2006.01) |
| *B01D 27/00* | (2006.01) |
| *B01D 35/027* | (2006.01) |
| *C02F 1/44* | (2006.01) |
| *B01D 35/34* | (2006.01) |
| *F25D 11/00* | (2006.01) |
| *B67D 7/76* | (2010.01) |
| *B01D 35/30* | (2006.01) |
| *B01D 27/10* | (2006.01) |
| *C02F 1/461* | (2006.01) |
| *B01D 35/147* | (2006.01) |
| *B01D 27/14* | (2006.01) |
| *C02F 9/00* | (2006.01) |

(52) U.S. Cl.
CPC ............ *F25D 23/028* (2013.01); *B01D 27/00* (2013.01); *B01D 27/103* (2013.01); *B01D 27/146* (2013.01); *B01D 35/027* (2013.01); *B01D 35/147* (2013.01); *B01D 35/306* (2013.01); *B01D 35/34* (2013.01); *B01D 2267/60* (2013.01); *B67D 7/76* (2013.01); *C02F 1/441* (2013.01); *C02F 1/461* (2013.01); *C02F 9/005* (2013.01); *C02F 2301/043* (2013.01); *C02F 2307/12* (2013.01); *F25C 2400/10* (2013.01); *F25D 11/00* (2013.01); *F25D 23/02* (2013.01); *F25D 23/12* (2013.01); *F25D 2323/121* (2013.01); *F25D 2323/122* (2013.01)

(58) Field of Classification Search
USPC ........ 62/389–400; 210/243, 416.3, 443, 282, 210/295, 694; 222/183, 146.1–146.6, 222/189.06–189.11, 318, 325–327
See application file for complete search history.

(56) References Cited

U.S. PATENT DOCUMENTS

| | | | | |
|---|---|---|---|---|
| 5,707,518 | A * | 1/1998 | Coates | B01D 35/153 210/232 |
| 5,753,107 | A * | 5/1998 | Magnusson | B01D 35/153 210/109 |
| 5,766,453 | A * | 6/1998 | Morellato | B01D 61/08 141/360 |
| 6,207,046 | B1 * | 3/2001 | Yamashita | B67D 1/07 210/138 |
| 6,303,031 | B1 * | 10/2001 | Senner | B01D 35/143 210/232 |
| 6,405,900 | B1 * | 6/2002 | Kown | B67D 1/0016 222/1 |
| 6,428,689 | B1 * | 8/2002 | Kameyama | C02F 1/46104 204/228.1 |
| 6,773,588 | B2 * | 8/2004 | Beeman | B01D 61/04 210/103 |
| 6,821,414 | B1 * | 11/2004 | Johnson | C02F 1/008 210/181 |
| 7,658,212 | B2 * | 2/2010 | Meuleners | F25D 23/126 141/360 |
| 2003/0024860 | A1 * | 2/2003 | Fritze | B01D 35/143 210/97 |
| 2007/0084771 | A1 * | 4/2007 | Watanabe | B01D 61/08 210/175 |
| 2010/0101929 | A1 * | 4/2010 | Kamen | B01D 1/28 202/185.3 |
| 2011/0139698 | A1 * | 6/2011 | Freystedt | B01D 35/147 210/232 |
| 2011/0147194 | A1 * | 6/2011 | Kamen | B01D 1/0082 202/185.1 |
| 2011/0303543 | A1 * | 12/2011 | Fritze | B01D 35/06 204/554 |
| 2013/0283844 | A1 * | 10/2013 | Lee | F25D 23/028 62/340 |
| 2014/0144822 | A1 * | 5/2014 | Senninger | C02F 1/003 210/97 |
| 2014/0230481 | A1 * | 8/2014 | Yun | F25D 23/126 62/340 |
| 2015/0225226 | A1 * | 8/2015 | You | B67D 1/0895 222/54 |
| 2016/0025406 | A1 * | 1/2016 | An | F25D 23/126 222/143 |

* cited by examiner

REFRIGERATOR

CROSS-REFERENCE TO RELATED APPLICATIONS

This application claims priority under 35 U.S.C. §119 from Korean Patent Application No. 10-2014-0094629, filed on Jul. 25, 2014 in the Korean Intellectual Property Office, the disclosure of which is incorporated herein by reference in its entirety.

BACKGROUND

1. Field

The disclosure herein generally relates to a refrigerator, and more particularly, to a refrigerator which filters water provided from a water source, supplies the water to an ice maker and a dispenser, and is equipped with a water tank for temporarily storing the water to be supplied to the dispenser.

2. Description of the Related Art

A conventional refrigerator may be equipped with a water supply line for receiving water (e.g., tap water) from an external water source and supplying the water, a filter which is engaged with the water supply line, a water tank for temporarily storing the filtered water, and a dispenser in order to provide a function of supplying filtered water in addition to its intrinsic functions, such as a refrigeration function and a freezing function.

In addition, an ice maker for making ice may be supplied with water by being engaged with the water supply line.

However, a water tank of the conventional refrigerator is placed inside a body of the refrigerator and is not detachable from the refrigerator. Thus, a user is unable to clean the water tank. In this regard, when using the refrigerator for a long period, the water tank may be covered with scale, and various impurities may be deposited thereto. Thus, the user may use a water tank which is in an insanitary condition.

In addition, the user may also be unable to clean the water supply line which is embedded in the body of the refrigerator. Thus, the user may use a water supply line which is also in an insanitary condition.

SUMMARY

Additional aspects and/or advantages will be set forth in part in the description which follows and, in part, will be apparent from the description, or may be learned by practice of the disclosure.

The disclosure has been provided to address the aforementioned and other problems and disadvantages occurring in the related art, and an aspect of the disclosure provides a refrigerator where a filter and a water tank are detachably placed inside a door so that a minimum length of a water supply line from the filter to a water outlet of a dispenser is maintained and the water tank and the water supply line may be maintained sanitarily.

In addition, another aspect of the disclosure provides a refrigerator which is equipped with a sterilizer inside a door so as to sterilize the refrigerator and a water supply line embedded in the door.

A refrigerator according to an exemplary embodiment may include a body configured to be equipped with a storage, a door configured to be hinge-engaged with the body to open or close the storage, a water supply line configured to respectively supply water provided from a water source to an ice maker placed in the storage and a dispenser placed outside the door, at least one filter configured to be engaged with the water supply line, at least one bypass valve for water tank configured to be engaged with the water supply line at a part which is lower than an engagement point of the filter (downstream from the filter), and at least one water tank configured to be placed inside the door and detachably engaged with the bypass valve for water tank.

In response to the water tank being mounted, the bypass valve for the water tank may lead water which passed through the at least one filter to the dispenser via the water tank.

In response to the water tank being detached, the bypass valve for the water tank may lead water to the dispenser.

The bypass valve for the water tank may include a valve housing configured to be equipped with an inlet and an outlet which are respectively engaged with the water supply line, a flow path selecting member configured to be equipped with a first flow path and a second flow path which communicate in a mutually selective manner with an inflow path engaged with the inlet and an outflow path engaged with the outlet, and an engagement unit to which a mouth of the water tank is mounted.

In response to the mouth of the water tank being mounted to the engagement unit, the first flow path may lead water to pass through the water tank. In addition, in response to the mouth of the water tank being detached from the engagement unit, the second flow path may make water bypass the water tank.

The filter may be placed inside the door.

The refrigerator may further include at least one bypass valve for the filter configured to be engaged with the water supply line and detachably engaged with the at least one filter.

In response to the filter being mounted, the bypass valve for the filter may lead water provided from the water source to the dispenser via at least one filter.

In response to the filter being detached, the bypass valve for filter may lead water provided from the water source to the dispenser.

The filter may be placed close to the water tank.

The bypass valve for the water tank and the bypass valve for the filter may be fixed to an inside of the door by a single mounting unit.

The refrigerator may include a valve configured to be mounted on the water supply line in order to selectively supply water provided from the water source to the ice maker and the dispenser.

The refrigerator may further include a sterilizer configured to be engaged with the water line at a part which is higher than an engagement point of the filter.

The sterilizer may include a valve, a pressure regulator configured to be engaged with the valve, and an electrolysis module configured to be engaged with the pressure regulator.

A refrigerator according to an exemplary embodiment may include a body configured to be equipped with a storage, a door configured to be hinge-engaged with the body to open or close the storage, a water supply line configured to respectively supply water provided from a water source to an ice maker placed in the storage and a dispenser placed outside the door, a plurality of filters configured to be detachably engaged with the water supply line and placed inside the door, and a plurality of water tanks configured to be detachably engaged with the water supply line at a part which is lower than an engagement point of the plurality of filters and placed inside the door. In addition, in response to one of the plurality of filters and the plurality of water tanks being detached from the water supply line, water bypasses a part of the water supply line from which the filters or the water tanks were detached.

The refrigerator may include a plurality of bypass valves corresponding to each filter configured to be engaged with the water supply line and detachably engaged with each of the plurality of filters and a plurality of bypass valves corresponding to each water tank configured to be engaged with the water supply line and detachably engaged with each of the plurality of water tanks.

The plurality of bypass valves for the filters may be engaged in (connected in) series. In addition, the plurality of bypass valves for the water tanks may be engaged in (connected in) series.

The plurality of filters and the plurality of water tanks may be placed inside the door.

A refrigerator according to an exemplary embodiment may include a body configured to be equipped with a storage, a door configured to be hinge-engaged with the body to open or close the storage, a water supply line configured to respectively supply water provided from a water source to an ice maker placed in the storage and a dispenser placed outside the door, a plurality of filters configured to be placed inside the door and detachably engaged with each of a plurality of bypass valves corresponding to each filter engaged with the water supply line, a plurality of water tanks configured to be placed inside the door and detachably engaged with each of a plurality of bypass valves corresponding to each water tank engaged with the water supply, and a sterilizer configured to be engaged with the water supply line at a part which is higher than an engagement point of the plurality of filters and which sterilizes water provided from the water source through electrolysis.

The plurality of bypass valves for the filters may be engaged with each other in series. In addition, the plurality of bypass valves for the water tanks may be engaged with each other in series.

A refrigerator according to an exemplary embodiment may include a body including a storage, a door engaged with the body to open or close the storage, a water supply line to selectively supply water provided from a water source to an ice maker and a dispenser, a filter valve disposed on the water supply line, which is connectable with a filter, a water tank valve disposed on the water supply line, which is connectable with a water tank, and a control valve disposed between the filter valve and water tank valve, which selectively controls the supply of water to the ice maker and dispenser. The filter valve and water tank valve may be disposed adjacent to one another in an inside portion of the door which is accessible to a user and may be arranged such that the filter is vertically disposed when the filter is connected to the filter valve and the water tank is vertically disposed when the water tank is connected to the water tank valve.

The filter valve may be disposed upstream from the water tank valve relative to the water source.

The filter valve may include a flow path selecting member which directs water along a first path when the filter is connected to the filter valve such that water passes through the filter valve and the filter before being supplied to the ice maker and dispenser, and directs water along a second path when the filter is disconnected from the filter valve such that water flows through the filter valve without passing through the filter, before being supplied to the ice maker and dispenser.

The water tank valve may include a flow path selecting member which directs water along a first path when the water tank is connected to the water tank valve such that water passes through the water tank valve and the water tank before being supplied to the dispenser, and directs water along a second path when the water tank is disconnected from the water tank valve such that water flows through the water tank valve without passing through the water tank, before being supplied to the dispenser.

BRIEF DESCRIPTION OF THE DRAWINGS

The above and/or other aspects of the disclosure will be more apparent by describing certain exemplary embodiments of the disclosure with reference to the accompanying drawings, in which.

DETAILED DESCRIPTION

Reference will now be made in detail to the embodiments, the examples of which are illustrated in the accompanying drawings, wherein like reference numerals refer to like elements throughout. The embodiments are described below to explain the disclosure by referring to the figures.

Certain exemplary embodiments are described in greater detail below with reference to the accompanying drawings.

As mentioned above, in the following description, like drawing reference numerals are used for like elements, even in different drawings. The matters disclosed in the description, such as a detailed construction and elements, are provided to assist in a comprehensive understanding of the exemplary embodiments. However, the exemplary embodiments may be practiced without specifically defined matters. Also, well-known functions or constructions are not described in detail since they would obscure the application with unnecessary detail.

Figure 1:
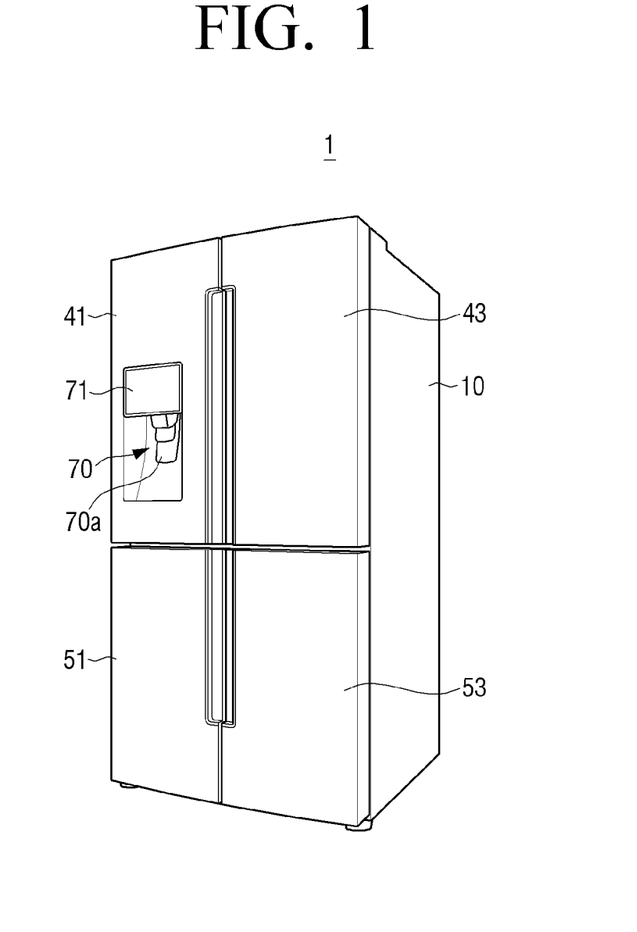
FIG. 1 is a perspective view illustrating an appearance of a refrigerator according to an exemplary embodiment.
Figure 2:
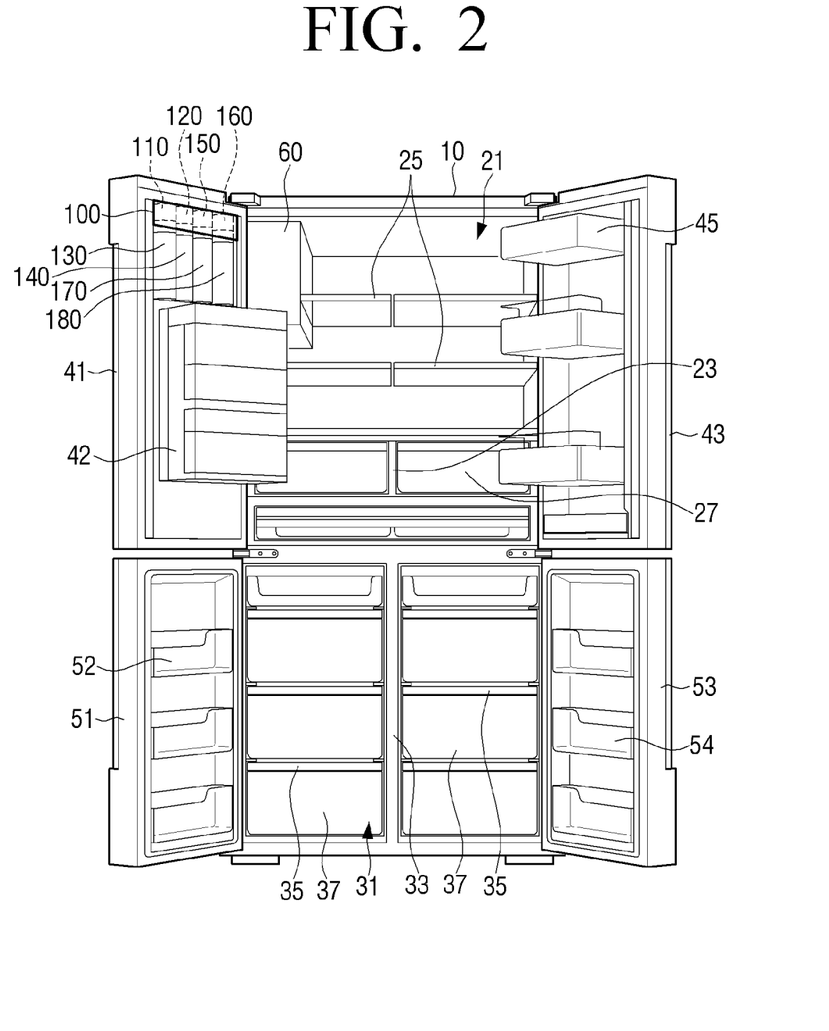
FIG. 2 is a perspective view illustrating an inside of a refrigerator according to an exemplary embodiment.

Referring to FIGS. 1 and 2, a refrigerator 1 according to an exemplary embodiment may include a body 10 which is equipped with an upper storage 21 and a lower storage 31 for storing certain contents, upper doors 41, 43, and lower doors 51, 53 which are hinge-engaged with the body 10 and respectively open and close the upper storage 21 and the lower storage 31.

The upper storage 21 may be controlled to be in a temperature range for refrigerating contents and may be divided into a plurality of spaces by a bulkhead 23 and a plurality of partitions 25 (e.g., which may be vertically and/or horizontally arranged). Spaces divided by the bulkhead 23 may include one or more withdrawable storage drawers 27.

An ice maker 60 may be placed or disposed at an appropriate position of an inside space of the upper storage 21, for example.

The lower storage 31 may be controlled to be in a temperature range for freezing contents and may be divided into a plurality of spaces by a bulkhead 33 and a plurality of partitions 35 (e.g., which may be vertically and/or horizontally arranged). In this case, each space may include a plurality of storage drawers 37.

Herein, the upper storage 21 may be used for refrigeration and the lower storage 31 may be used for freezing, but this is merely an example. That is, the upper storage 21 may be used for freezing and the lower storage 31 may be used for refrigeration. As another alternative example, the refrigerator may be arranged such that a left half is used for refrigeration while a right half is used for freezing. The storages for freezing and refrigeration may further be differently arranged as would be understood by one of ordinary skill in the art. Likewise, the number of doors for the refrigerator may vary, and may include one, two, three, four, or more than four doors, for example.

In addition, herein, the upper storage 21 and the lower storage 31 may be placed in a vertical direction, but this is merely an example. That is, the upper storage 21 and the lower storage 31 may be placed in a horizontal direction, or may be implemented as a single storage.

The upper doors 41, 43 may be formed of a pair of doors which are placed in a horizontal direction to open or close the upper storage 21. In an outside of the door 41 among the pair of upper doors 41, 43, a dispenser 70 may be mounted.

In an inside of the upper door 41 to which the dispenser 70 is mounted, a first filter 130, a second filter 140, a first water tank 170, and a second water tank 180 may be mounted. In case the first filter 130, the second filter 140, the first water tank 170, and the second water tank 180 are mounted inside the upper door 41, the user may be able to easily access the components. In this case, replacement of the first filter 130 and the second filter 140 may be also facilitated. Further, the first water tank 170 and the second water tank 180 may be easily detached from a mounting unit 100 and be used as a water container, for example, or may be cleaned, for example.

As described above, as the first filter 130, the second filter 140, the first water tank 170, and the second water tank 180 are placed inside the upper door 41, a length of the water supply line 90 from the first and second filters 130, 140 to an outlet for discharging water of the dispenser 70 may be maintained to a minimum degree. That is, in an exemplary embodiment, it is possible to reduce a germ remaining section on the water supply line 90 by minimizing the length of the water supply line 90. Thus, sanitary maintenance of the water supply line 90 may be achieved and/or improved.

In addition, each of the upper doors 41, 43 may include a case 42 and a plurality of shelves 45 for storing contents in an inside thereof.

Like the upper doors 41, 43, the lower doors 51, 53 may be formed of a pair of doors. In this case, each of the lower doors 51, 53 may include a plurality of shelves 52, 54 for storing contents in an inside thereof.

Figure 3:
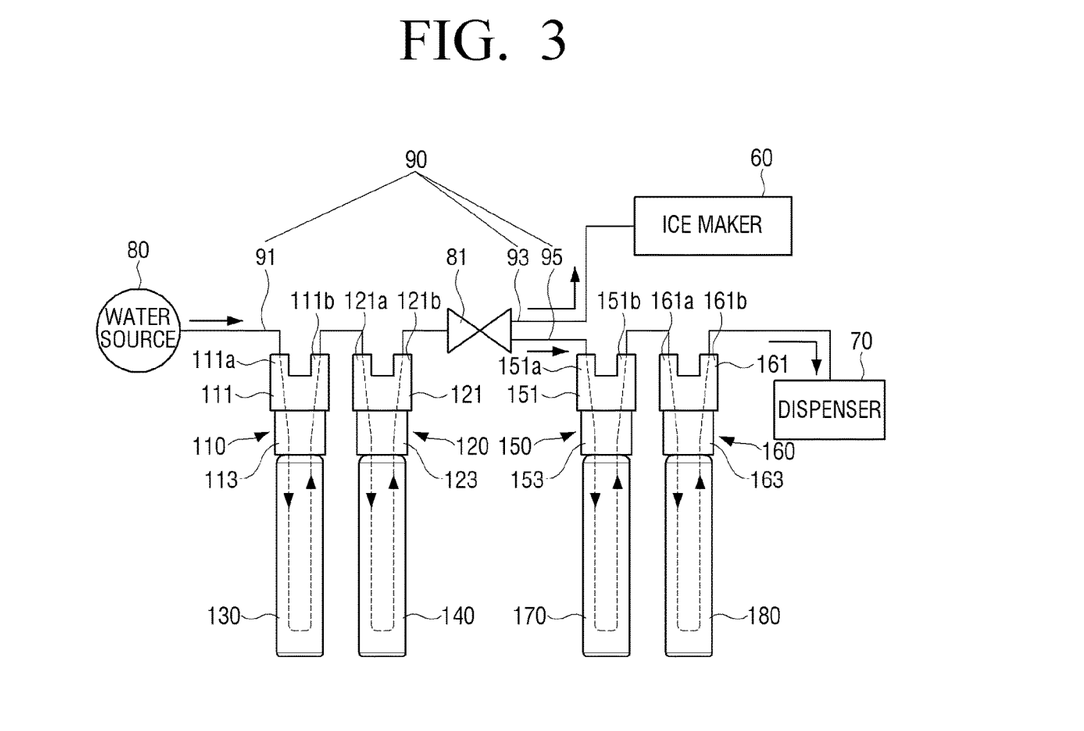
FIG. 3 is a schematic view illustrating a water supply line of a refrigerator according to an exemplary embodiment.

Referring to FIG. 3, there is provided the water supply line 90 for filtering water provided from a water source 80 and supplying the water to the ice maker 60 and the dispenser 70.

It may be preferable, but it is not required, that the water supply line 90 is placed inside the body 10 so as not to be exposed outside the refrigerator 1. It may be further preferable, but it is not required, that the water supply line 90 is placed inside the upper door 41 so as not to be exposed outside the refrigerator 1.

The water supply line 90 may include a first line 91, a second line 93, and a third line 95.

A bypass valve 110 for the first filter, a bypass valve 120 for the second filter, and a first valve 81 may be engaged with the first line 91 sequentially from an upper part which is adjacent to the water source 80 to a lower part. That is, the first line 91 may begin at a point which is connected to the water source 80, and thereafter be connected to the bypass valve 110 and bypass valve 120 sequentially. The first line 91 may be output from the bypass valve 120 and be input into the first valve 81. The second line 93 and the third line 95 may be output from the first valve 81, for example.

The first filter 130 and the second filter 140 may be detachably engaged with the bypass valve 110 for the first filter and the bypass valve 120 for the second filter.

The second line 93 and the third line 95 may be ramified (branched) from the first valve 81. The second line 93 may be engaged with the ice maker 60, and the third line 95 may be engaged with the dispenser 70. In this case, the third line 95 may be engaged with a bypass valve 150 for the first water tank 170 and a bypass valve 160 for the second water tank 180 at a part which is higher than an engagement point of the dispenser 70. The first water tank 170 and the second water tank 180 may be detachably engaged with (using) the bypass valve 150 for the first water tank and the bypass valve 160 for the second water tank.

Meanwhile, in an exemplary embodiment, two filters 130, 140 and two water tanks 170, 180 may be provided, but this is merely an example. That is, one or more filters may be provided and one or more water tanks may be provided. Alternatively, two or more filters may be provided, and/or two or more water tanks may be provided.

The first valve 81 may selectively supply water filtered by the first and second filters 130, 140 to the ice maker 60 and the dispenser 70. For example, a user may be able to supply water to the ice maker 60 by controlling the first valve 81 through a touch screen 71 (refer to FIG. 1) which may be placed outside the upper door 41. In addition, the user may be able to supply water to the dispenser 70 through the first valve 81 by pressing a lever 70a of the dispenser 70. Additionally, or alternatively, a user may be able to supply water to the ice maker 60 by using a switch, button, or lever or some device other than the touch screen. Likewise, a user may alternatively or additionally be able to supply water to the dispenser 70 using the touch screen 71, switch, button, etc.

Each of the bypass valve 110 for the first filter and the bypass valve 120 for the second filter may be engaged in series (sequentially) with the first line 91 of the water supply line 90. In this case, each of the bypass valve 110 for the first filter and the bypass valve 120 for the second filter may include a valve housing 111, 121 having an inlet 111a, 121a into which water flows through the first line 91 and an outlet 111b, 121b from which the water is discharged. In addition, the bypass valve 110 for the first filter and the bypass valve 120 for the second filter may include an engagement unit 113, 123 which is extended to the valve housing 111, 121. The first filter 130 and the second filter 140 may be detachably mounted on the engagement unit 113, 123.

The first filter 130 and the second filter 140 may filter water provided from the water source 80. According to a water filtering performance that a user wants, two or more filters may be provided. In this case, it may be preferable, but it is not required to provide a bypass valve for each filter, i.e., providing a same number of bypass valves as the number of filters.

The first filter 130 and the second filter 140 may be placed to be exposed on an inside of the upper door 41 so that a user is able to easily access the filters, which enables the user to more easily perform a filter replacement job.

Each of the bypass valve 150 for the first water tank and the bypass valve 160 for the second water tank may be engaged in series with the third line 95 of the water supply line 90. In this case, each of the bypass valve 150 for the first water tank and the bypass valve 160 for the second water tank may include a valve housing 151, 161 having an inlet 151a, 161a into which water flows through the first line 91 and an outlet 151b, 161b from which the water is discharged. In addition, the bypass valve 150 for the first water tank and the bypass valve 160 for the second water tank may include an engagement unit 153, 163 which is extended to the valve housing 151, 161. The first water tank 170 and the second water tank 180 may be detachably mounted on the engagement unit 153, 163.

The first water tank 170 and the second water tank 180 may temporarily store water to be supplied to the dispenser 70 and supply the cooled water to the dispenser 70.

In addition, the first water tank 170 and the second water tank 180 may be detached from the bypass valve 150 for the first water tank and the bypass valve 160 for the second water tank. In this case, the first water tank 170 and the second water tank 180 may be used as a water container and may be formed of transparent plastic material, glass, or stainless steel, etc.

Like the first filter 130 and the second filter 140, the first water tank 170 and the second water tank 180 may be placed to be exposed on the inside of the upper door 41 so that the user is able to easily access the water tanks. Accordingly, the user is able to easily detach the first water tank 170 and the second water tank 180 from the bypass valve 150 for the first water tank and the bypass valve 160 for the second water tank and clean the water tanks. Thus, unlike the conventional water tank, it is possible to maintain the water tank to be in a clean (sanitary) condition.

According to an exemplary embodiment, the first and the second filters 130, 140 and the first and the second water tanks 170, 180 may be placed inside the door 41 out of the pair of upper doors 41, 43, but this is merely an example. That is, the first and the second filters 130, 140 and the first and the second water tanks 170, 180 may be placed inside the other door 43. In addition, the first and the second filters 130, 140 and the first and the second water tanks 170, 180 may be placed on any one of a plurality of inner walls forming the upper storage 21. For example, to minimize a length of the supply line between the water source and ice maker, it may be preferable, but it is not required, to place the first and the second filters 130, 140 and the first and the second water tanks 170, 180 inside a door which is on a side of the refrigerator which is the same side of the refrigerator at which the ice maker is positioned and/or the dispenser 70.

The bypass valves 110, 120 for the first and the second filters and the bypass valves 150, 160 for the first and the second water tanks may be mounted on a single mounting unit 100 (refer to FIG. 2) fixed on the inside of the upper door 41.

It may be preferable, but it is not required, that the single mounting unit 100 is formed as a shape of a housing lower side of which is opened so as to respectively engage/detach the first and the second filters 130, 140 with/from the bypass valves 110, 120 for the first and the second filters and to respectively engage/detach the first and the second water tanks 170, 180 with/from the bypass valves 150, 160 for the first and the second water tanks.

As described above, as the bypass valves 110, 120 for the first and the second filters and the bypass valves 150, 160 for the first and the second water tanks are placed in an adjacent range by the single mounting unit 100, arrangement efficiency and maintainability of the bypass valves 110, 120 for the first and the second filters and the bypass valves 150, 160 for the first and the second water tanks may be enhanced. In addition, the first and the second filters 130, 140 and the first and the second water tanks 170, 180 may be vertically engaged with the bypass valves 110, 120 for the first and the second filters and the bypass valves 150, 160 for the first and the second water tanks, and thus, the user is able to easily grab (access, replace, maintain, etc.) the first and the second filters 130, 140 and the first and the second water tanks 170, 180.

The bypass valves 110, 120 for the first and the second filters and the bypass valves 150, 160 for the first and the second water tanks may include the same bypass structure. Hereinafter, a structure of the bypass valve 160 for the second water tank will be described with reference to FIGS. 5 and 6.

Figure 5:
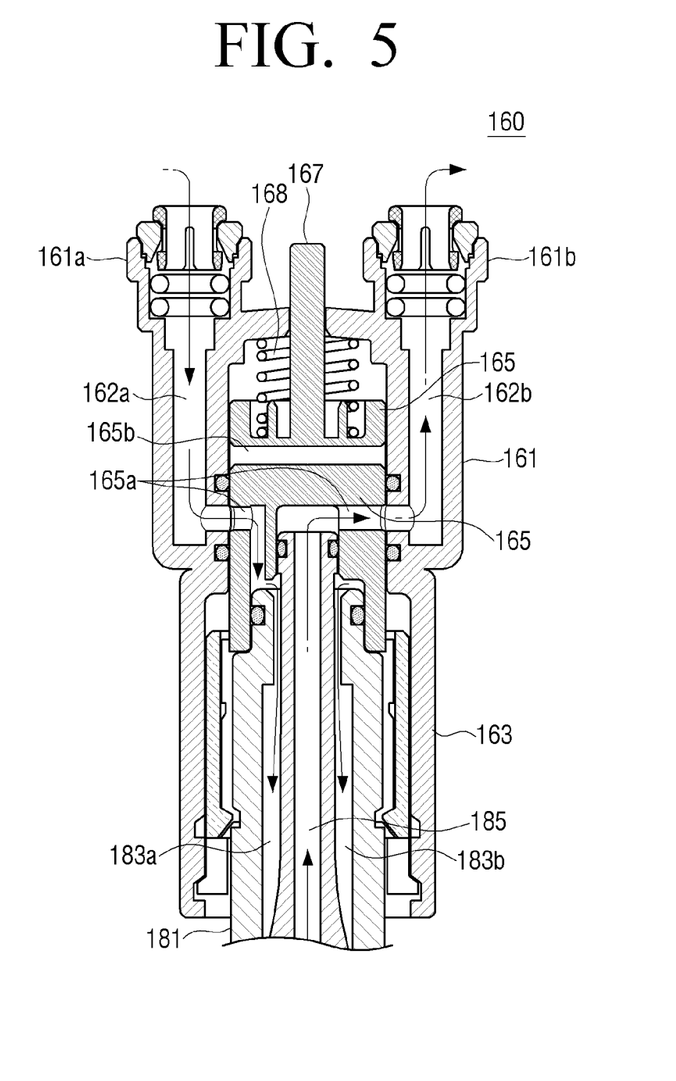
FIG. 5 is a block diagram illustrating a structure of a flow path within a bypass valve for a second water tank when the second water tank is engaged with a water supply line as shown in FIG. 3.
Figure 6:
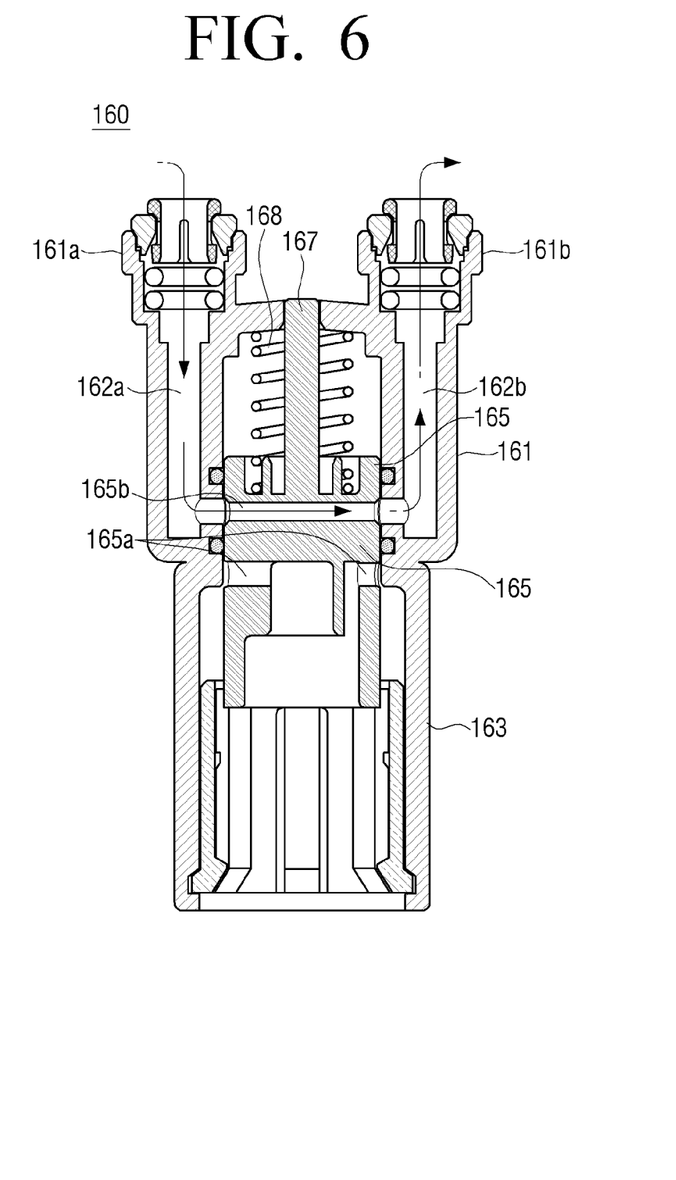
FIG. 6 is a block diagram illustrating a structure of a flow path within a bypass valve for a second water tank when the second water tank is detached from a water supply line as shown in FIG. 4.

The bypass valve 160 for the second water tank may include a valve housing 161, the engagement unit 163, and a flow path selecting member 165.

The valve housing 161 may include an inlet 161a for bringing water into the valve housing 161 and an outlet 161b for discharging the water to an outside of the valve housing 161 via the flow path selecting member 165. In this case, each of the inlet 161a and the outlet 161b may be engaged with the third line 95.

The engagement unit 163 may be extended from the valve housing 161, and a mouth 181 of the second water tank 180 may be detachably engaged with the engagement unit 163.

As the mouth 181 of the second water tank 180 is engaged with or detached from the engagement unit 163, the flow path selecting member 165 may select a flow path for leading the water which is brought into the valve housing 161 through the inlet 161a to the dispenser 70 via the second water tank 180 or directly leading the water to the dispenser 70 without passing through the second water tank 180.

The flow path selecting member 165 may be placed so as to be moved in a vertical direction in the valve housing 161 and may be elastically supported by a resilient member 168 (e.g., a spring or coil). In this case, in order to guide vertical movement of the flow path selecting member 165, a guide bar 167 may be formed on an upper side of the flow path selecting member 165 as a protrusion. The guide bar 167 may be engaged with the upper side of the valve housing 161 in a penetrating manner so as to slide in the housing.

The flow path selecting member 165 may include a first flow path 165a and a second flow path 165b for connecting an inflow path 162a engaged with the inlet 161a and an outflow path 162b engaged with the outlet 161b.

As the flow path selecting member 165 rises in response to the mouth 181 of the second water tank 180 being mounted into the engagement unit 163, the first flow path 165a sequentially connects the inflow path 162a, the second water tank 180, and the outflow path 162b. Accordingly, the water which was brought into the inflow path 162a inflows into the inside of the second water tank 180 via the first flow path 165a and then is discharged to the outflow path 162b through the first flow path 165a. In this case, the water which was brought into the second water tank 180 fills the second water tank 180 via an inlet path 183a, 183b and then is discharged to the outflow path 162b through an outlet path 185.

As the mouth 181 of the second water tank 180 is detached from the engagement unit 163, the second flow path 165b descends and directly connects the inflow path 162a and the outflow path 162b. Accordingly, the water which was brought into the inflow path 162 may be discharged to the outflow path 162b through the first flow path 165a.

As described above, in an exemplary embodiment, water may be supplied to the dispenser 70 without leaking even though the user removes the second water tank 180 from the bypass valve 160 for the second water tank.

It may be preferable, but it is not required, that an inner flow path of the first and the second filters 130, 140 and the first water tank 170 includes an inlet path and an outlet path in the same manner as the second water tank 180 illustrated in FIG. 5.

Meanwhile, in FIG. 3, reference numerals 111a, 121a, and 151a refer to an inlet for bringing water into the valve housing 110, 120, 150, and reference numerals 111b, 121b, and 151b refer to an outlet for discharging the water from the valve housing 110, 120, 150.

Hereinafter, water flow with respect to the water supply line 90 of the refrigerator 1 having the aforementioned structure will be described with reference to FIGS. 3 to 8.

As shown in FIG. 3, in the state where the first and the second filters 130, 140 and the first and the second water tanks 170, 180 are engaged with the bypass valves 110, 120, 150, 160, after the water provided from the water source 80 inflows into the first line 90, the water is filtered through the bypass valves 110, 120 for the first and the second filters by sequentially passing through the first and the second filters 130, 140.

Subsequently, the filtered water may be supplied to the second line 93 through the first valve 81 and then may be supplied to the ice maker 60. Simultaneously or selectively, the water may be supplied to the dispenser 70 through the third line 95 and the bypass valves 150, 160 for the first and the second water tanks by sequentially passing through the first and the second water tanks 170, 180.

Figure 4:
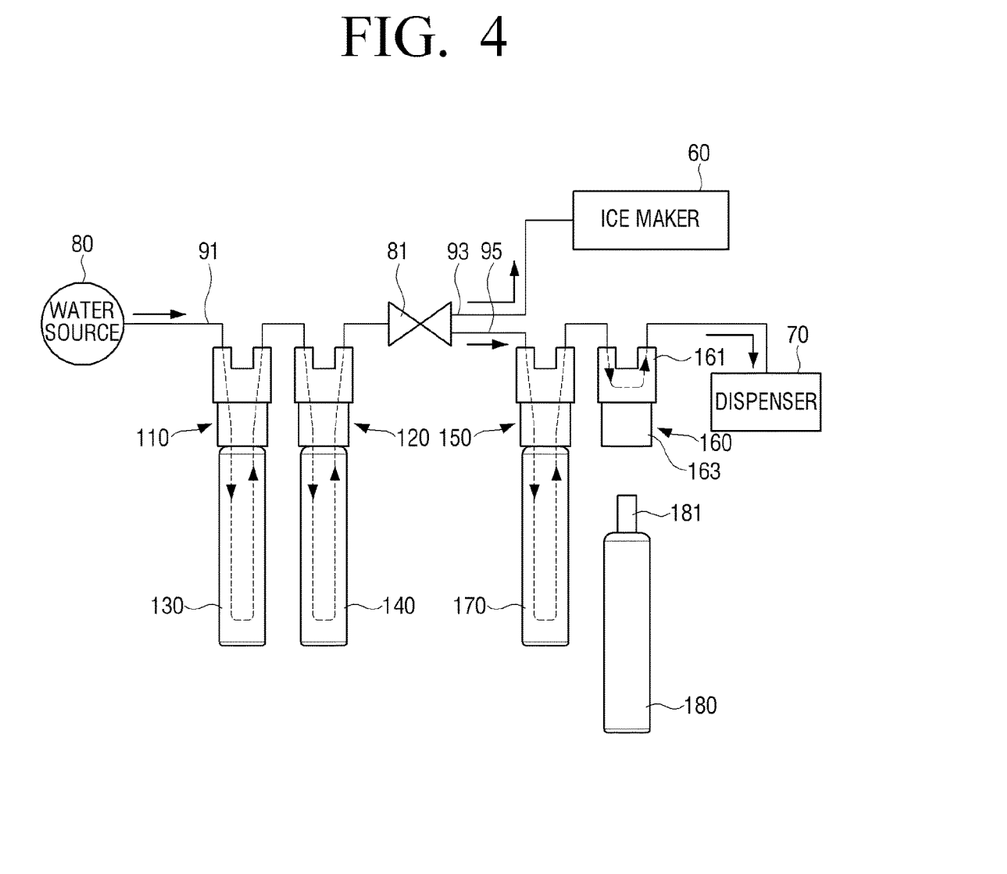
FIG. 4 is a schematic view illustrating water flow when a second water tank is detached from a water supply line.

Meanwhile, as shown in FIG. 4, the mouth 181 of the second water tank 180 may be detached from the engagement unit 163 of the bypass valve 160 for the second water tank. The second water tank 180 may be detached by a user for using the water stored in the second water tank 180 or cleaning the second water tank 180. As described above with reference to FIG. 6, the flow path selecting member 165 operates and the water which was brought into the inlet 161a may be directly guided to the outlet 161b through the second flow path 165b. That is, the bypass valve 160 for the second water tank from which the second water tank 180 is detached bypasses and supplies the water to the dispenser 70.

Figure 7:
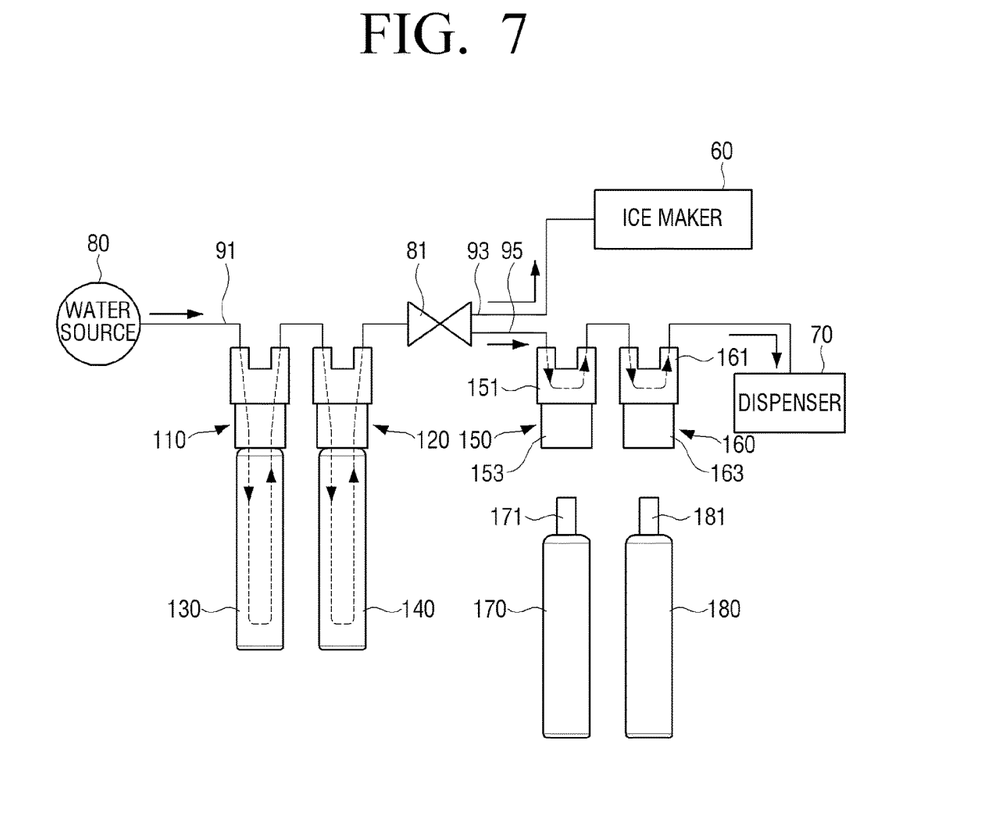
FIG. 7 is a schematic view illustrating water flow when a first water tank and a second water tank are detached from a water supply line.

In addition, as shown in FIG. 7, in response to a mouth 171, 181 of the first and the second water tanks 170, 180 being detached from the engagement unit 153, 163 of the bypass valve 150 for the first water tank and the bypass valve 160 for the second water tank, the water supplied to the third line 95 sequentially bypasses the bypass valve 150 for the first water tank and the bypass valve 160 of the second water tank and is supplied to the dispenser 70.

Figure 8:
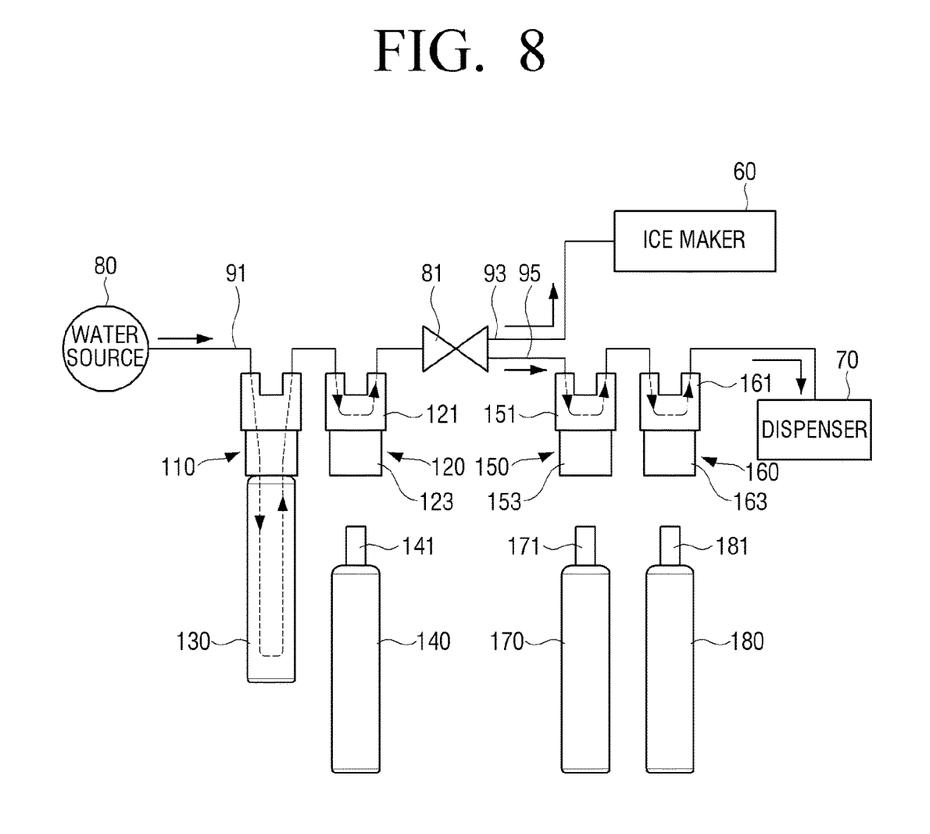
FIG. 8 is a schematic view illustrating water flow when a first filter, a first water tank, and a second water tank are detached from a water supply line.

As shown in FIG. 8, in response to a mouth 141 of the second filter 140 being detached from the bypass valve 120 for the second filter and a mouth 171, 181 of the first and the second water tanks 170, 180 being simultaneously detached from the engagement unit 153, 163 of the bypass valves 150, 160 of the first and the second water tanks, the water which passed through the first filter 130 bypasses the bypass valve 120 for the second filter and is supplied to the first valve 81. Subsequently, the filtered water is supplied to each of the second line 93 and the third line 95, and the water supplied to the third line 95 sequentially bypasses the bypass valves 150, 160 of the first and the second water tanks and is supplied to the dispenser 70.

Although it is not depicted in the drawings, when the first and the second filters 130, 140 are detached from the bypass valves 110, 120 for the first and the second filters while the bypass valves 110, 120, 150, 160 are disengaged with the filters 130, 140 and the water tanks 170, 180, the water provided from the water source 80 sequentially bypasses the bypass valves 110, 120 for the first and the second filters through the first line 91 and is supplied to the first valve 81. Of course, there are other possibilities according to which filter(s) and/or water tank(s) are engaged or disengaged from their respective bypass valves, as would be understood by one of ordinary skill in the art. For example, only one of the filters may be detached from a bypass valve 110, 120, and both water tanks 170, 180 may be disengaged from bypass valves 150, 160.

As described above, in an exemplary embodiment, the filters 130, 140 and the water tanks 170, 180 may be placed to be exposed on the inside of the upper door 41, and thus, the user is able to easily replace the filters 130, 140 and the water tanks 170, 180. Further, the water tanks 170, 180 may be easily detached from the bypass valves 150, 160 and cleaned and maintained in a clean condition.

Figure 9:
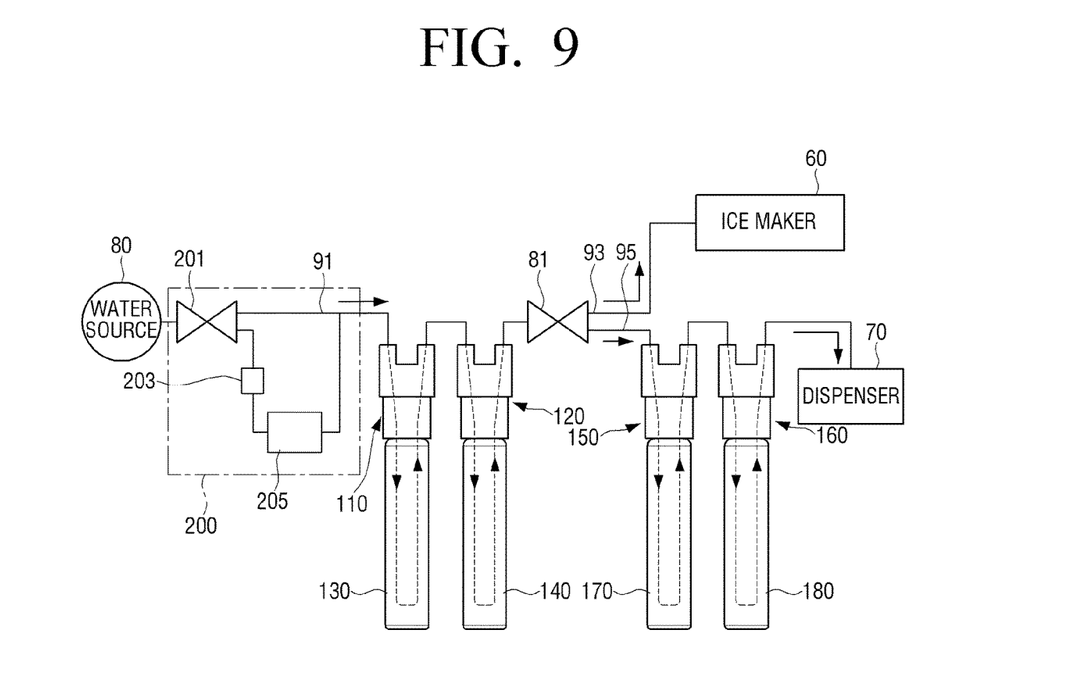
FIG. 9 is a schematic view illustrating a status where a sterilizer is added to a water supply line in order to generate sterilized water through electrolysis.

Meanwhile, according to an exemplary embodiment, the refrigerator 1 may include a sterilizer 200 for sterilizing germs which remain in the water supply line 90 so as to strengthen sanitation of the water supply line 90.

Referring to FIG. 9, it may be preferable, but it is not required, that the sterilizer 200 is engaged on the water supply line 90 with an upper part of the bypass valve 110 for the first filter. Specially, the sterilizer 200 may be placed inside the upper door 41. More specifically, the sterilizer may be disposed between the water source 80 and the bypass valve 110/first filter 130.

The sterilizer 200 may include a second valve 201, a pressure regulator 203, and an electrolysis module 205.

According to a sterilization mode and a non-sterilization mode, the second valve 201 may supply the water provided from the water source 80 to the electrolysis module 205 or (directly) to the first line 91 (i.e., without water passing through the electrolysis module 205.

For example, the sterilization mode and the non-sterilization mode may be set through a touch screen 71 mounted on an outside of the upper door 41 or a button (not shown) or a switch (not shown) mounted on any one of the body 10 and the door 41, 43, 51, 53. In response to the elapse of a predetermined time, the sterilization mode may be switched to the non-sterilization mode.

The pressure regulator 203 may maintain a certain water pressure in order to maintain a certain quality of sterilized water generated by the electrolysis module 205.

The electrolysis module 205 may convert the water supplied from the pressure regulator 203 into the sterilized water. For this operation, the electrolysis module 205 may include a pair of electrode plates (not shown) and an electrode separating plate (not shown) which is placed between the pair of electrode plates. In this case, the electrolysis module 205 may include a pair of electrode rods (not shown) which apply different electrodes to a pair of electrode plates so as to cause underwater sparking between the electrode plates and a frame (not shown) which accommodates the pair of electrode plates and fixes an electrode plate module.

The electrolysis module 205 may generate sterilized water according to following process.

In response to the underwater sparking being caused by applying a certain direct current (mA) of low voltage (V) to the pair of electrode plates, an inside of the electrolysis module 205 reaches a plasma state and generates a large amount of anions. In this process, a water molecule is divided into a hydrogen ion (H+) and an oxygen ion (O—), and the oxygen ion which is an anion generates a hydroxyl (OH—) while continuously reacting with other adjacent water molecules.

At this point, hypochlorous acid (HOCL) which may include the slightest amount of chlorine ingredients included in tap water provided from the water source 80 is divided into HCL+ and O— and generates sterilization materials such as an anion of an oxygen system (O— and $O_3$—) and hydrogen peroxide ($H_2O_2$).

The generated hydroxyl (OH—) and the anion of the oxygen system (O—, $O_3$—) sterilize germs and remove impurities with strong sterilizing power and oxidizing power. Meanwhile, the generated anion is reduced to water (e.g., natural water) due to a reduction operation of sterilizing germs or removing impurities. Thus, the anion may continuously generate the sterilized water having the sterilizing power without generating contamination as other chemical additives do.

The sterilizer 200 may sterilize the water supply line 90 according to the following process, for example. For example, in response to the lever 70*a* of the dispenser being pressed in the sterilization mode, water supplied through the second valve 201 is supplied at a certain pressure to the electrolysis module 205 through the pressure regulator 203. In this case, the electrolysis module 205 generates the supplied water as the sterilized water. The sterilized water is transferred to the dispenser 70 along the water supply line 90 and then is discharged to the outside of the water supply line 90 through the dispenser 70.

As described above, in an exemplary embodiment, the inside of the water supply line 90 may be cleaned (sanitized) through the sterilizer 200.

Accordingly, in an exemplary embodiment, the filters 130, 140 and the water tanks 170, 180 may be detachably mounted on the inside of the upper door 41 so that a minimum length of the water supply line 90 from the filters 130, 140 and the water outlet of the dispenser is maintained, in order to resolve a sanitation problem of the water supply line 90 and the water tanks 170, 180. In addition, in order to strengthen the sanitation, the sterilizer 200 for sterilizing the body 10 of the refrigerator 1 and the water supply line 90 buried in the door 41 may be provided. Accordingly, it may be possible to maintain the water supply line 90 and the water tanks 170, 180 to be in the clean condition.

The foregoing exemplary embodiments and advantages are merely exemplary and are not to be construed as limiting the disclosure. The disclosure may be readily applied to other types of devices. Also, the description of the exemplary embodiments is intended to be illustrative, and not to limit the scope of the claims, and many alternatives, modifications, and variations will be apparent to those skilled in the art.

Although example embodiments have been shown and described, it would be appreciated by those skilled in the art that changes may be made to these embodiments without departing from the principles and spirit of the disclosure, the scope of which is defined in the claims and their equivalents.

What is claimed is:
1. A refrigerator, comprising:
a body including a storage;
a door engaged with the body to open or close the storage;
a water supply line to selectively supply water provided from a water source to an ice maker and a dispenser;
a filter bypass valve engaged with the water supply line and engageable with a filter; and
a water tank bypass valve engaged with the water supply line at an engagement point downstream from an engagement point of the filter bypass valve; and
at least one water tank provided inside the door and detachably engaged with the water tank bypass valve,
wherein the water tank bypass valve comprises:
a valve housing including an inlet and an outlet which are respectively engaged with the water supply line,
a flow path selecting member including a first flow path and a second flow path which communicate in a mutually selective manner with an inflow path engaged with the inlet and an outflow path engaged with the outlet, and
an engagement unit which is engageable with a mouth of the at least one water tank to mount the at least one water tank to the water tank bypass valve,
wherein
when the mouth of the at least one water tank is mounted to the engagement unit, the first flow path leads water from the water supply line to pass through the at least one water tank, and
when the mouth of the at least one water tank is detached from the engagement unit, water from the water supply line flows through the second flow path without passing through the at least one water tank.

2. The refrigerator as claimed in claim 1, wherein, when the water tank bypass valve is engaged with the at least one water tank, the water tank bypass valve leads water which passed through the filter bypass valve to the dispenser via the at least one water tank.

3. The refrigerator as claimed in claim 2, wherein when the at least one water tank is detached from the water tank bypass valve, the water tank bypass valve leads water to the dispenser.

4. The refrigerator as claimed in claim 1, wherein when the filter is engaged with the filter bypass valve, the filter is placed inside the door.

5. The refrigerator as claimed in claim 1, wherein the filter bypass valve comprises:
a first filter bypass valve engaged with the water supply line and engageable with a first filter; and
a second filter bypass valve connected in series with the first filter bypass valve and engaged with the water supply line and engageable with a second filter.

6. The refrigerator as claimed in claim 1, wherein when the filter is engaged with the filter bypass valve, the filter bypass valve leads water provided from the water source to the dispenser via the filter.

7. The refrigerator as claimed in claim 6, wherein when the filter is detached from the filter bypass valve, the filter bypass valve leads water provided from the water source to the dispenser.

8. The refrigerator as claimed in claim 4, wherein the filter is placed adjacent to the at least one water tank.

9. The refrigerator as claimed in claim 1, wherein the water tank bypass valve and the filter bypass valve are fixed to an inside of the door by a single mounting unit.

10. The refrigerator as claimed in claim 1, comprising:
a control valve mounted on the water supply line to selectively supply water provided from the water source to the ice maker and the dispenser.

11. The refrigerator as claimed in claim 1, further comprising:
a sterilizer engaged with the water line at an engagement point which is upstream from an engagement point of the filter bypass valve.

12. The refrigerator as claimed in claim 11, wherein the sterilizer comprises:
a valve;
a pressure regulator engaged with the valve; and
an electrolysis module engaged with the pressure regulator.

13. The refrigerator as claimed in claim 1, wherein the filter, the filter bypass valve, the water tank bypass valve, and the at least one water tank are mounted on a mounting unit fixed on the door, and the filter and the at least one water tank are disposed adjacent to one another.

14. The refrigerator as claimed in claim 13, wherein
the at least one water tank is configured to temporarily store water filtered by the filter to be supplied to the dispenser, and
when the at least one water tank is detached from the engagement unit, the water temporarily stored in the at least one water tank is consumable by a user, and an inside of the at least one water tank in which the water is temporarily stored is cleanable so that the at least one water tank can be sanitized and remounted to the engagement unit.

15. A refrigerator, comprising:
a body including a storage;
a door engaged with the body to open or close the storage;
a water supply line to selectively supply water provided from a water source to an ice maker and a dispenser;
a plurality of filters placed inside the door and configured to be detachably engaged with the water supply line;
a plurality of water tanks placed inside the door and configured to be detachably engaged with the water supply line at an engagement point which is downstream from an engagement point of the plurality of filters; and
a plurality of water tank bypass valves configured to be engaged with the water supply line and detachably engaged with the plurality of water tanks, respectively,
wherein in response to one of the plurality of filters or one of the plurality of water tanks being detached from the water supply line, water is supplied to one of the ice maker and the dispenser through the water supply line without passing through the detached filter or water tank,
wherein at least one water tank bypass valve among the plurality of water tank bypass valves comprises:
a valve housing including an inlet and an outlet which are respectively engaged with the water supply line,
a flow path selecting member including a first flow path and a second flow path which communicate in a mutually selective manner with an inflow path engaged with the inlet and an outflow path engaged with the outlet, and
an engagement unit which is engageable with a mouth of a respective water tank among the plurality of water tanks to mount the respective water tank to the at least one water tank bypass valve,
wherein
when the mouth of the respective water tank is mounted to the engagement unit, the first flow path leads water from the water supply line to pass through the respective water tank, and
when the mouth of the respective water tank is detached from the engagement unit, water from the water supply line flows through the second flow path without passing through the respective water tank.

16. The refrigerator as claimed in claim 15, comprising:
a plurality of filter bypass valves configured to be engaged with the water supply line and detachably engaged with the plurality of filters.

17. The refrigerator as claimed in claim 16, wherein the plurality of filter bypass valves are connected in series, and wherein the plurality of water tank bypass valves are connected in series.

18. The refrigerator as claimed in claim 15, wherein the plurality of filters and the plurality of water tanks are placed inside the door adjacent to one another in an upright manner.

19. A refrigerator, comprising:
a body including a storage;
a door engaged with the body to open or close the storage;
a water supply line to selectively supply water provided from a water source to an ice maker and a dispenser;
a plurality of filters placed inside the door and detachably engaged with a plurality of filter bypass valves which are engaged with the water supply line;
a plurality of water tanks placed inside the door and detachably engaged with a plurality of water tank bypass valves which are engaged with the water supply line; and
a sterilizer to sterilize water provided from the water source through electrolysis, the sterilizer being engaged with the water supply line at an engagement point which is upstream from engagement points of the plurality of filters,
wherein at least one water tank bypass valve among the plurality of water tank bypass valves comprises:
a valve housing including an inlet and an outlet which are respectively engaged with the water supply line,
a flow path selecting member including a first flow path and a second flow path which communicate in a mutually selective manner with an inflow path engaged with the inlet and an outflow path engaged with the outlet, and
an engagement unit which is engageable with a mouth of a respective water tank among the plurality of water tanks to mount the respective water tank to the at least one water tank bypass valve,
wherein
when the mouth of the respective water tank is mounted to the engagement unit, the first flow path leads water from the water supply line to pass through the respective water tank, and
when the mouth of the respective water tank is detached from the engagement unit, water from the water supply line flows through the second flow path without passing through the respective water tank.

20. The refrigerator as claimed in claim 19, wherein the plurality of filter bypass valves are connected in series, and wherein the plurality of water tank bypass valves are connected in series.

* * * * *